(12) United States Patent
Hwang et al.

(10) Patent No.: US 8,300,195 B2
(45) Date of Patent: Oct. 30, 2012

(54) BALANCE BOARD AND LIQUID CRYSTAL DISPLAY HAVING THE SAME

(75) Inventors: Eui-Dong Hwang, Seoul (KR);
Yun-Gun Lee, Cheonan-si (KR);
Dal-Jung Kwon, Seoul (KR);
Myoung-Soo Kim, Cheonan-si (KR);
Byung-Kyou Min, Seoul (KR)

(73) Assignee: Samsung Electronics Co., Ltd. (KR)

( * ) Notice: Subject to any disclaimer, the term of this patent is extended or adjusted under 35 U.S.C. 154(b) by 755 days.

(21) Appl. No.: 12/498,190

(22) Filed: Jul. 6, 2009

(65) Prior Publication Data
US 2010/0073271 A1 Mar. 25, 2010

(30) Foreign Application Priority Data
Sep. 24, 2008 (KR) ........................ 10-2008-0093812

(51) Int. Cl.
*G02F 1/1345* (2006.01)
(52) U.S. Cl. ........................ 349/149; 349/152
(58) Field of Classification Search ........... 349/149–152
See application file for complete search history.

(56) References Cited

U.S. PATENT DOCUMENTS
7,880,715 B2 * 2/2011 Hwang et al. ................ 345/102

FOREIGN PATENT DOCUMENTS
| JP | 2005039271 | 2/2005 |
| JP | 2005039272 | 2/2005 |
| KR | 200236149 | 10/2001 |

* cited by examiner

*Primary Examiner* — James Dudek
(74) *Attorney, Agent, or Firm* — Cantor Colburn LLP

(57) ABSTRACT

A balance board includes; a substrate, a first wire disposed on the substrate, a second wire disposed on the substrate and spaced apart from the first wire, a plurality of first balance coils connected to the first wire and which uniformly distribute a first power supply voltage, a plurality of second balance coils connected to the second wire and which uniformly distribute a second power supply voltage, and a conductive pattern disposed on the substrate and spaced apart from the first and second wires, wherein the first and second wires are disposed substantially in parallel with each other, the second wire being divided into a plurality of parts with respect to an area where the first wire and the second wire cross over one another and the plurality of parts of the second wire are connected by a plurality of jumper connectors overlapping the first wire.

22 Claims, 9 Drawing Sheets

BALANCE BOARD AND LIQUID CRYSTAL DISPLAY HAVING THE SAME

This application claims priority to Korean Patent Application No. 10-2008-0093812, filed on Sep. 24, 2008, and all the benefits accruing therefrom under 35 U.S.C. §119, the contents of which in its entirety are incorporated herein by reference.

BACKGROUND OF THE INVENTION

1. Field of the Invention

The present invention relates to a balance board and a liquid crystal display ("LCD") having the balance board, and more particularly, to a balance board which can minimize variations in the current applied to a light source and can thus improve display quality and an LCD having the balance board.

2. Description of the Related Art

In recent years, the demand for flat panel displays, examples of which include plasma display panels ("PDPs"), plasma address liquid crystal ("PALC") displays, liquid crystal displays ("LCDs") and organic light-emitting diode ("OLED") displays have exponentially increased because conventional cathode ray tube ("CRT") devices are insufficient to meet the demand for the development of thin, large-scale display devices. Since most flat panel display devices, and particularly, LCDs, can provide high picture quality and are light-weighted and thin, LCDs have been widely used in various electronic devices.

LCDs generally include a first display panel having a plurality of pixel electrodes, a second display panel having a common electrode, and a liquid crystal panel having a dielectric-anisotropy liquid crystal layer interposed between the first and second display panels. An LCD may display a desired image by generating an electric field between the plurality of pixel electrodes and the common electrode, and adjusting the intensity of the electric field so as to control the orientation of the liquid crystal molecules to thereby control the amount of light transmitted through the liquid crystal panel. LCDs are not self-emitting display devices and may typically include a backlight assembly. Backlights for use in the backlight assembly of an LCD may emit light to one of the display panels as a surface light source. More specifically, backlights are surface light sources into which point light sources such as light-emitting diodes or line light sources such as lamps are transformed with the aid of various optical elements such as a waveguide plate, a diffusion plate and optical sheets.

A surface light source can uniformly emit light with the aid of a plurality of point light sources or a plurality of line light sources. In order for the surface light source to uniformly emit light, the point light sources or the line light sources may each be required to emit the same amount of light as the other light sources. For this reason, the point light sources or the line light sources may be formed to have the same capacity and the same size. In addition, in order to have uniform light emission from all the light sources, it is necessary to supply a uniform power supply voltage to each of the point light sources or the line light sources while preventing variations in the power supply voltage.

BRIEF SUMMARY OF THE INVENTION

Aspects of the present invention provide a balance board which can minimize variations in the current applied to a light source and can thus improve display quality.

Aspects of the present invention also provide a liquid crystal display ("LCD") having a balance board which can minimize variations in the current applied to a light source and can thus improve display quality.

However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

According to one exemplary embodiment of the present invention, a balance board includes; a substrate, a first wire disposed on the substrate and to which a first power supply voltage is applied, a second wire disposed on the substrate and spaced apart from the first wire and to which a second power supply voltage having a substantially opposite phase to that of the first power supply voltage is applied, a plurality of first balance coils connected to the first wire and which uniformly distribute the first power supply voltage, a plurality of second balance coils connected to the second wire and which uniformly distribute the second power supply voltage, and a conductive pattern disposed on the substrate and spaced apart from the first and second wires, wherein the first and second wires are disposed substantially in parallel with each other, the second wire being divided into a plurality of parts with respect to an area where the first wire and the second wire cross over one another, and the plurality of parts of the second wire are connected by a plurality of jumper connectors overlapping the first wire.

According to another exemplary embodiment of the present invention a liquid crystal display includes; a liquid crystal panel which displays an image, a plurality of lamps which provide light to the liquid crystal panel, and a balance board including; a substrate, a first wire disposed on the substrate and to which a first power supply voltage is applied, a second wire disposed on the substrate and spaced apart from the first wire and to which a second power supply voltage having a substantially opposite phase to that of the first power supply voltage is applied, a plurality of first balance coils connected to the first wire and which uniformly distribute the first power supply voltage, a plurality of second balance coils connected to the second wire and which uniformly distribute the second power supply voltage, and a conductive pattern disposed on the substrate and spaced apart from the first and second wires, wherein the first and second wires are disposed substantially in parallel with each other, the second wire being divided into a plurality of parts with respect to an area where the first wire and the second wire cross over one another, and the plurality of parts of the second wire are connected by a plurality of jumper connectors overlapping the first wire.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
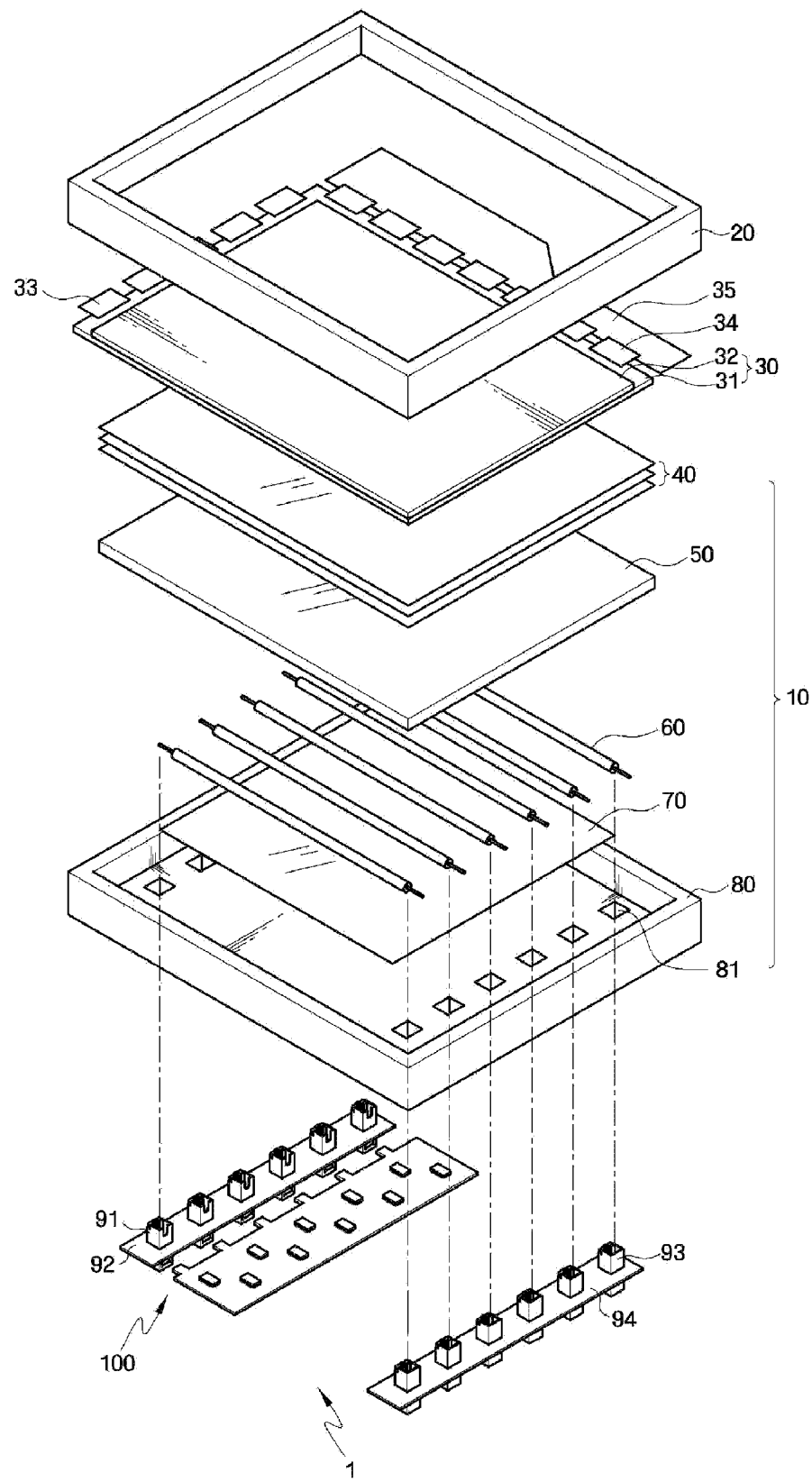
FIG. 1 is an exploded front perspective view of an exemplary embodiment of a liquid crystal display ("LCD") according to the present invention.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Figure 2:
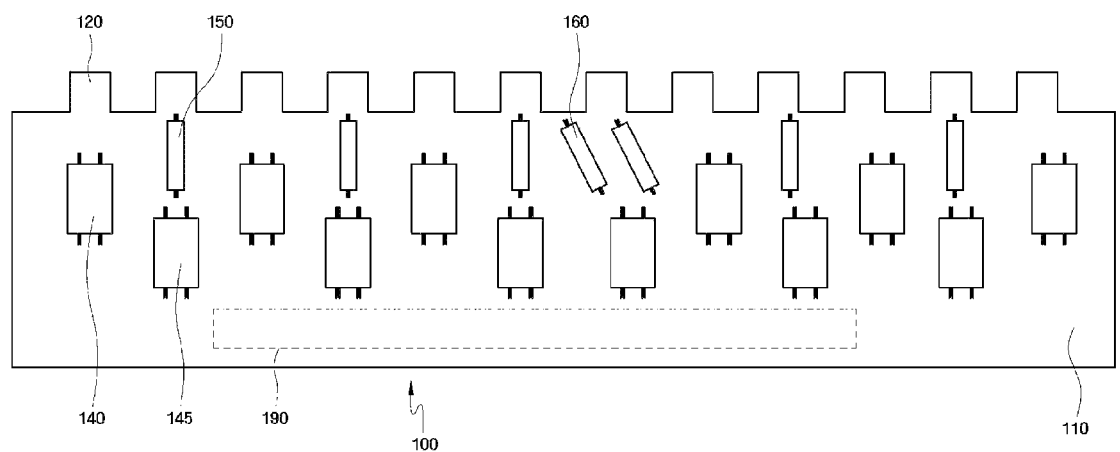
FIG. 2 is a top plan view of an exemplary embodiment of a balance board shown in FIG. 1.
Figure 3:
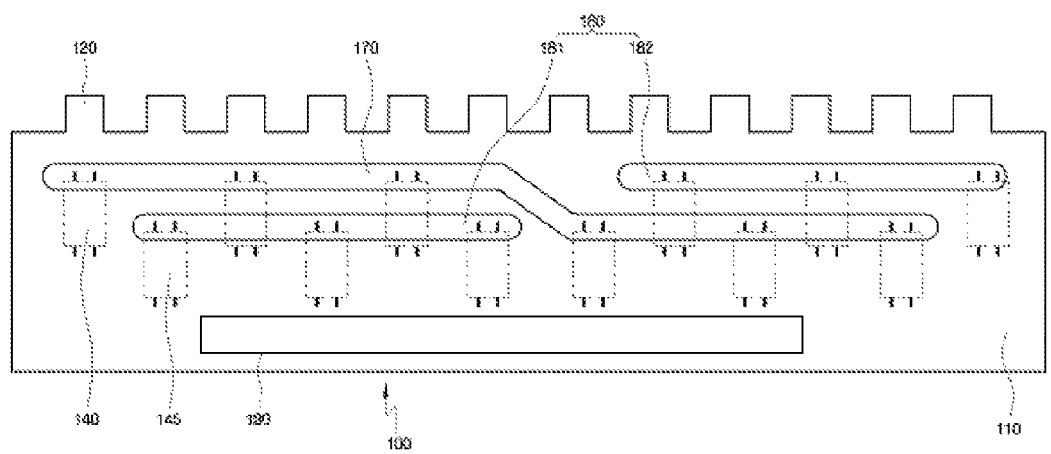
FIG. 3 is a bottom plan view of the exemplary embodiment of a balance board shown in FIG. 2.
Figure 4:
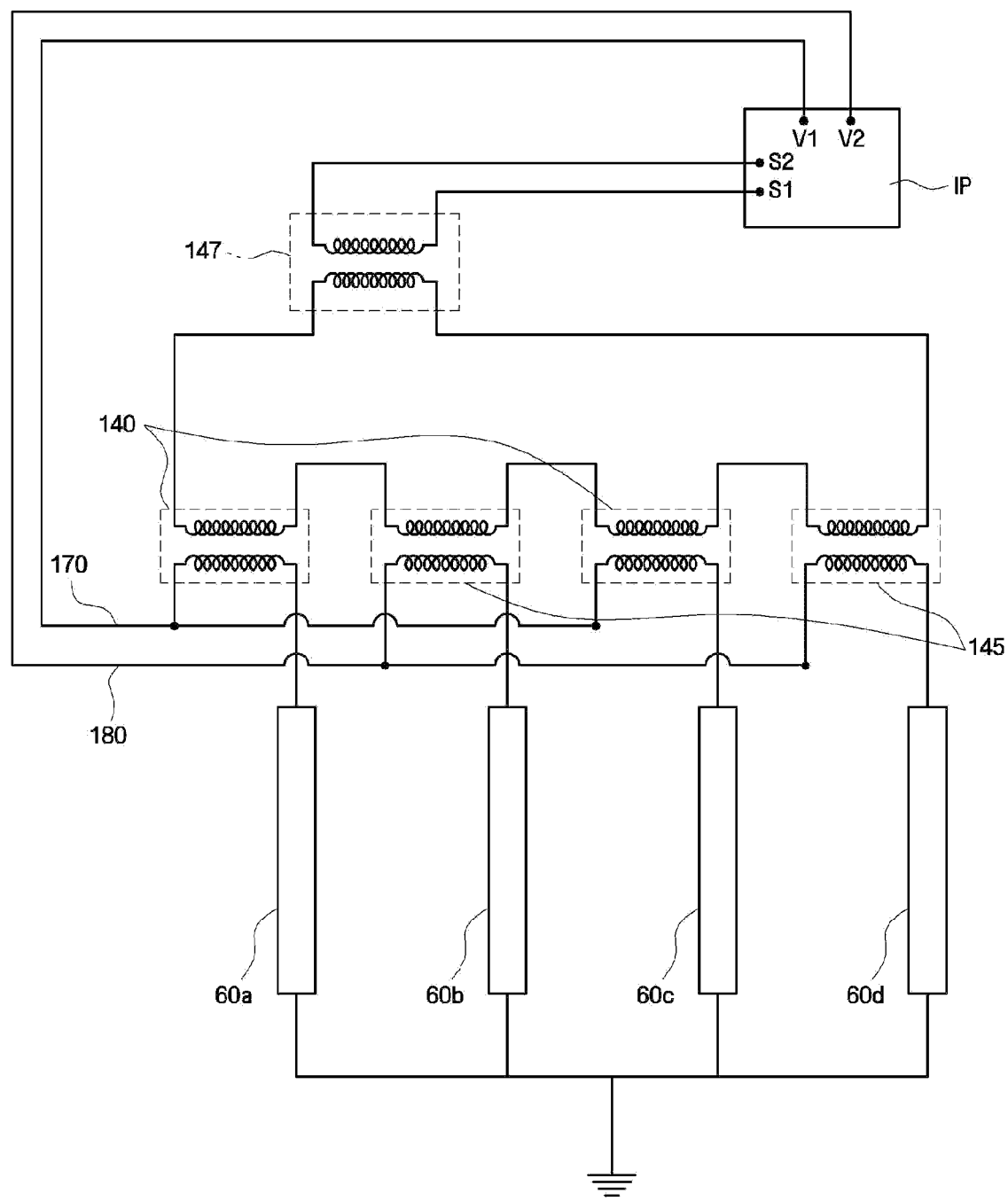
FIG. 4 is an equivalent circuit diagram illustrating the exemplary embodiment of a balance board shown in FIG. 1 and a plurality of lamps and an inverter of the exemplary embodiment of an LCD shown in FIG. 1.
Figure 5:
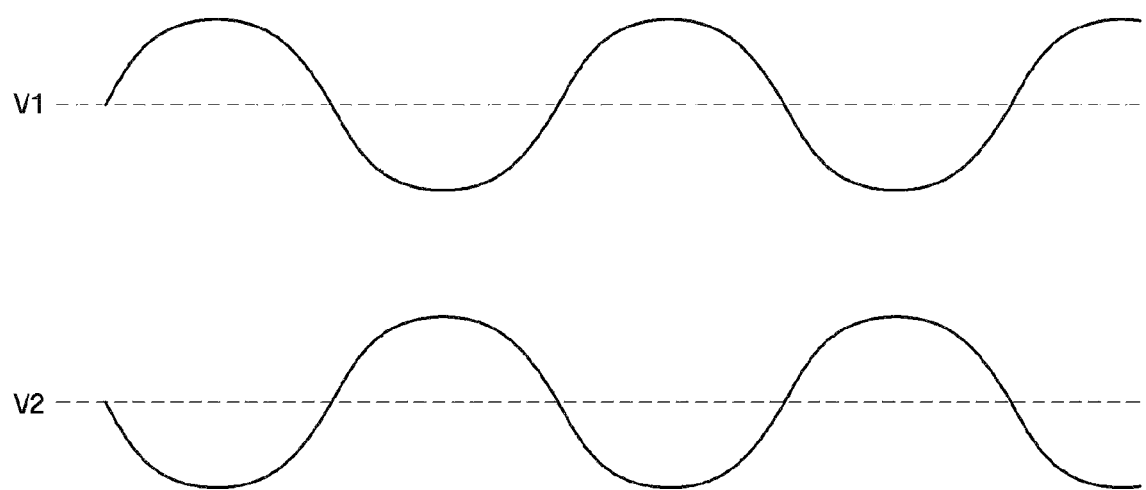
FIG. 5 is a waveform diagram illustrating the waveforms of voltages applied to the exemplary embodiment of a balance board shown in FIG. 2.

An exemplary embodiment of a balance board and a liquid crystal display ("LCD") having the balance board, according to the present invention will hereinafter be described in detail with reference to FIGS. 1 through 5. FIG. 1 is an exploded front perspective view of an exemplary embodiment of an LCD 1 according to the present invention, FIG. 2 is a top plan view of an exemplary embodiment of a balance board 100 shown in FIG. 1, FIG. 3 is a bottom plan view of the exemplary embodiment of a balance board 100, FIG. 4 is an equivalent circuit diagram illustrating the exemplary embodiment of a balance board 100 shown in FIG. 1 and a plurality of lamps 60a through 60d and an inverter IP of the exemplary embodiment of an LCD shown in FIG. 1, and FIG. 5 is a waveform diagram illustrating the waveforms of voltages applied to the exemplary embodiment of a balance board 100.

Referring to FIG. 1, the LCD 1 may include a liquid crystal panel assembly, an upper container 20, a backlight assembly 10 and the balance board 100.

The liquid crystal panel assembly may include a liquid crystal panel 30, a plurality of gate tape carrier packages ("TCPs") 33, a plurality of data TCPs 34 and an integrated printed circuit board ("PCB") 35. The liquid crystal panel 30 may include a lower display panel 31, an upper display panel 32 and a liquid crystal layer (not shown) interposed between the lower display panel 31 and the upper display panel 32.

In one exemplary embodiment, the lower display panel 31 may include a plurality of gate lines (not shown), a plurality of data lines (not shown), and a thin-film transistor ("TFT") array, and a plurality of pixel electrodes. In such an exemplary embodiment, the upper display panel 32 may include black matrices and a common electrode and may face the lower display panel 31. The liquid crystal panel 30 may display image data. Alternative exemplary embodiments include configurations wherein the lower display panel 31 may include various additional components or components from the upper display panel 32.

In one exemplary embodiment, the gate TCPs 33 may be connected to the gate lines formed on the lower display panel 31, and the data TCPs 34 may be connected to the data lines formed on the lower display panel 31. Exemplary embodiments of the gate TCPs 33 and the data TCPs 34 include tape automated bonding ("TAB") tapes, which connect a semiconductor chip to wiring patterns on a base film through TAB.

Various driving elements for applying a gate driving signal to the gate TCPs 35 and applying a data driving signal to the data TCPs 34 may be mounted on the integrated PCB 35. While the present exemplary embodiment has been described with reference to gate TCPs, data TCPs an integrated PCBs, the present invention is not limited thereto and may include various other gate and data driving apparatuses.

The upper container 20 may form the exterior of the LCD 1. The upper container 20 has a recess therein and may thus accommodate the liquid crystal panel assembly therein. An open window may be formed in the middle of the top of the upper container 20, and thus the liquid crystal panel 30 may be exposed through the open window of the upper container 20.

The upper container 20 may be coupled to a lower container 80. In an alternative exemplary embodiment, the LCD 1 may also include a middle frame (not shown). The middle frame may be disposed between the upper container 20 and the lower container 80, and may accommodate a plurality of optical sheets 40, a diffusion plate 50 and a plurality of lamps 60 therein. However, in the present exemplary embodiment, the plurality of optical sheets 40, the diffusion plate 50 and the plurality of lamps 60 are contained between the LC panel 30 and the lower container 80

The backlight assembly 10 may be disposed below the liquid crystal panel 30 and may provide light to the liquid crystal panel 30. The backlight assembly 10 may include the lamps 60, a plurality of first lamp sockets 91, a plurality of second lamp sockets 93, the optical sheets 40, the diffusion plate 50, a reflective sheet 70 and the lower container 80.

Various types of light sources may be used as the lamps 60. Exemplary embodiments of the lamps 60 include light-emitting diodes ("LEDs"), cold cathode fluorescent lamps ("CCFLs"), hot cathode fluorescent lamps ("HCFLs"), external electrode fluorescent lamps ("EEFLs") and various other light-emitting devices.

In one exemplary embodiment, the lamps 60 may be evenly spaced from one another, and may be connected in parallel in phase with one another. In one exemplary embodiment, the lamps 60 may be direct-type lamps wherein the lamps 60 directly illuminate the overlying optical components, e.g., the diffusion plate 50. In alternative exemplary embodiments, the lamps 60 may illuminate the overlying optical components after passing through a light guide plate (not shown). In order to realize a uniform luminance distribution, the lamps 60 may be arranged substantially in parallel with each other in the longitudinal direction of the lower container 80. In the exemplary embodiment of FIGS. 1 through 5, the lamps 60 may be CCFLs.

The diffusion plate 50 may diffuse light emitted from the lamps 60 and may thus prevent bright lines from appearing along the contours of the lamps 60.

The optical sheets 40 may be disposed on the diffusion plate 50 and may diffuse and collect light provided by the lamps 60. In one exemplary embodiment, the optical sheets 40 may include an additional diffusion sheet, a first prism sheet and a second prism sheet. In such an exemplary embodiment, the first prism sheet may be disposed on the diffusion sheet, and may have an array of a plurality of triangular prism patterns formed thereon. The triangular prism pattern array of the first prism sheet may collect light diffused by the diffusion sheet and may emit the collected light. The second prism sheet may be disposed on the first prism sheet. In one exemplary embodiment, the second prism sheet may be a multi-layer reflective polarizer prism sheet collecting light, polarizing the collected light and emitting the polarized light. Alternative exemplary embodiments include configurations wherein the second prism sheet may be omitted if the first prism sheet can ensure sufficient luminance and sufficient viewing angles alone.

The reflective sheet 70 may be disposed below the lamps 60 and may reflect light emitted from the lamps 60 upwardly. In order to minimize the loss of light emitted from the lamps 60, in one exemplary embodiment, the reflective sheet 70 may be formed of a highly-reflective material.

First ends of the lamps 60 may be respectively inserted into the first lamp sockets 91, and second ends of the lamps 60 may be respectively inserted into the second lamp sockets 93. In this manner, the lamps 60 may be fixed to the lower container 80. The first lamp sockets 91 may be disposed at the first ends of the lamps 60, and the second lamp sockets 93 may be disposed at the second ends of the lamps 60. The first lamp sockets 91 and the second lamp sockets 93 may be fixed to the lower container 80 by inserting the first lamp sockets 91 in a first alignment plate 92 and inserting the second lamp sockets 93 in a second alignment plate 94. Exemplary embodiments include configurations wherein the lamp sockets and alignment plates are integrally formed from a solitary indivisible unit as described below.

The first lamp sockets 91 and the first alignment plate 92 may be formed in one body, and the second lamp sockets 93 and the second alignment plate 94 may be formed in one body, e.g., they may be injection molded as a single piece. Alternative exemplary embodiments include configurations wherein the first and second alignment plates 92 and 94 may be omitted. In this case, the first lamp sockets 91 and the second lamp sockets 93 may be directly inserted into a plurality of socket insertion holes 81 of the lower container 80 and may thus be fixed to the lower container 80.

The balance board 100 may be provided with a driving voltage by the inverter IP of FIG. 4 and may thus provide a uniform driving current to each of the lamps 60. The balance board 100 may be inserted into the first lamp sockets 91, and a ground terminal of the balance board 100 may be connected to the second lamp sockets 93.

The structure of the balance board 100 will hereinafter be described in further detail with reference to FIGS. 1 through 3.

The balance board 100 may include a substrate 110, a plurality of first balance coils 140, a plurality of second balance coils 145, a plurality of first jumper connectors 160, a plurality of second jumper connectors 150, a conductive pattern 190, a first wire 170 and a second wire 180. In one exemplary embodiment, the substrate 110 may be formed of a dielectric material. A plurality of protrusions 120 may be formed on one side of the substrate 110. A conductive line (not shown) may be formed on at least one side of the protrusions 120. The protrusions 120 may be inserted into the first lamp sockets 91 and may thus serve as paths for supplying a driving current to the lamps 60. In one exemplary embodiment, as many protrusions 120 as there are first lamp sockets 91 may be formed. In this case, the protrusions 120 may be inserted into each of the first lamp sockets 91, respectively.

The first balance coils 140, the second balance coils 145 or both may be connected to the protrusions 120. The first balance coils 140 may provide a high alternating current ("AC") voltage to the lamps 60, and the second balance coils 145 may provide a high AC voltage having an opposite phase to that of the high AC voltage provided by the first balance coils 140 to the lamps 60. In one exemplary embodiment, the high AC voltage is from about 400 Volts to about 3000 Volts. The lamps 60 connected to the first balance coils 140 may not necessarily coincide with the lamps 60 connected to the second balance coils 145. In one exemplary embodiment, the lamps 60 connected to the first balance coils 140 and the lamps 60 connected to the second balance coils 145 may be alternately arranged. The connections among the first balance coils 140, the second balance coils 145 and the lamps 60 will be described later in further detail.

In the present exemplary embodiment, the first balance coils 140, the second balance coils 145, the first jumper connectors 160, and the second jumper connectors 150 may be disposed on the top surface of the balance board 100. The first balance coils 140 and the second balance coils 145 may provide the same driving current to each of the lamps 60. More specifically, in order to prevent differences between the luminance levels of the lamps 60, the present invention applies the same driving current to each of the lamps 60. In order to reduce variations in the driving current applied to each of the lamps 60, a driving current may be applied to each of the lamps 60 using the first balance coils 140 and the second balance coils 145.

As discussed briefly above, the phase of a voltage applied to the lamps 60 by the first balance coils 140 may be opposite to the phase of a voltage applied to the lamps 60 by the second balance coils 145. That is, if the first balance coils 140 apply a positive voltage, the second balance coils 145 may apply a negative voltage. On the other hand, if the first balance coils 140 apply a negative voltage, the second balance coils 145 may apply a positive voltage.

The first balance coils 140 may be connected to one another by the first wire 170, and the second balance coils 145 may be connected to one another by the second wire 180. High AC voltages having opposite phases may be applied to the first and second wires 170 and 180.

Since the phase of the high AC voltage applied to the first wire 170 is opposite to the phase of the high AC voltage applied to the second wire 180, the first and second wires 170 and 180 may be spaced apart from each other in order to reduce the probability of being discharged, e.g., short-circuited.

The conductive pattern 190 may be formed on the substrate 110 and may form a capacitor together with the first and second wires 170 and 180. The conductive pattern 190 may be formed in various shapes that can allow the conductive pattern 190 to be capacitively coupled to the first and second wires 170 and 180. In one exemplary embodiment, the conductive pattern 190 may be a ground pattern. Alternative exemplary embodiments include configurations wherein the conductive pattern 190 may be a signal pattern for transmitting signals.

In one alternative exemplary embodiment, a plurality of conductive patterns 190 may be sporadically formed in a certain region on the balance board 100. In such an alternative exemplary embodiment, the conductive patterns 190 may be spaced a predetermined distance apart from one another and may thus be able to be capacitively coupled to the first and second wires 170 and 180.

In one exemplary embodiment, the first wire 170 and the conductive pattern 190 may form a first capacitor, and the second wire 180 and the conductive pattern 190 may form a second capacitor. In such an exemplary embodiment, the difference between the capacitance of the first capacitor and the capacitance of the second capacitor may be about 5 pF or less. More specifically, the first and second wires 170 and 180 may be formed so that the difference between the capacitance of the first capacitor and the capacitance of the second capacitor may be about 5 pF or less. Therefore, it is possible to maintain the difference between the phase of a voltage provided to the lamps 60 through the first wire 170 and the phase of a voltage provided to the lamps 60 through the second wire 180 and to minimize variations in the driving current applied to each of the lamps 60.

In order to maintain the difference between the capacitance of the first capacitor and the capacitance of the second capacitor at about 5 pF or less, the first and second wires 170 and 180 may be disposed substantially in parallel with each other, and the first wire 170 may divide the second wire 180 into two parts 181 and 182 by intersecting the second wire 180. The two parts 181 and 182 of the second wire 180 may be connected by the first jumper connectors 160, which overlap the first wire 170. More specifically, the capacitances of the first and second capacitors may be uniformly maintained by maintaining the average distance between the first wire 170 and the conductive pattern 190 to be substantially the same as the average distance between the second wire 170 and the conductive pattern 190. In order to maintain the average distance between the first wire 170 and the conductive pattern 190 to be the same as the average distance between the second wire 170 and the conductive pattern 190, the first and second wires 170 and 180 may be formed to cross-over each other. In order to prevent the first and second wires 170 from electrically, or physically contacting each other, the first jumper connectors 160 may be used to set up a detour for at least one of the first and second wires 170 and 180. Exemplary embodiments include configurations wherein the first jumper connectors 160 may be independent elements mounted on the substrate 110 or conductive patterns formed on the substrate 110.

In one exemplary embodiment, the first and second wires 170 and 180 may be formed on a first surface of the substrate 110, and the first jumper connectors 160 may be formed on a second surface of the substrate 110. The first and second surfaces of the substrate 110 may be opposite to each other, as shown in FIGS. 2 and 3.

The intersection between the first and second wires 170 and 180 may not necessarily coincide with the middle point of each of the first and second wires 170 and 180. The position of the intersection between the first and second wires 170 and 180 may vary according to the position and shape of the conductive pattern 190.

In one exemplary embodiment, the first and second wires 170 and 180 may be disposed near the protrusions 120 so as to be easily connected to the lamps 60.

The first balance coils 140 and the second balance coils 145 may be disposed near one of the first and second wires 170 and 180. Whichever of the first balance coils 140 and the second balance coils 145 are distant from the protrusions 120 may be connected to the protrusions 120 by the second jumper connectors 150.

The operations of the lamps 60, the first balance coils 140, the second balance coils 145 and the inverter IP and the connections among the lamps 60, the first balance coils 140, the second balance coils 145 and the inverter IP will hereinafter be described in detail with reference to FIGS. 4 and 5.

In one exemplary embodiment, each of the first balance coils 140 and the second balance coils 145 may be a transformer having first and second coils. The output voltage of each of the first balance coils 140 and the second balance coils 145 may be adjusted according to variations in the first and second coils of a corresponding balance coil. Since the first balance coils 140 and the second balance coils 145 are mainly for adjusting current variations, the voltages applied to the first balance coils 140 and the second balance coils 145 may not necessarily have to be adjusted. Thus, the input voltages and the output voltages of the first balance coils 140 and the second balance coils 145 may be maintained to be uniform.

In one exemplary embodiment, the first coils of the first balance coils 140 and the first coils of the second balance coils 145 may be connected together and may thus form a loop. Since the same current flows along the first coils of the first balance coils 140 and the first coils of the second balance coils 145, the same driving current may be applied to each of the lamps 60 through the first balance coils 140 and the second balance coils 145.

First ends of the second coils of the first balance coils 140 may be connected to the first wire 170, and second ends of the second coils of the first balance coils 140 may be connected to odd-numbered lamps 60a and 60c. First ends of the second coils of the second balance coils 145 may be connected to the second wire 180, and second ends of the second coils of the second balance coils 145 may be connected to even-numbered lamps 60b and 60d. A first power supply voltage V1 may be applied to the odd-numbered lamps 60a and 60c through the first balance coils 140, and a second power supply voltage V2 may be applied to the even-numbered lamps 60b and 60d through the second balance coils 145. Referring to FIG. 5, the first and second power supply voltages V1 and V2 may be high AC voltages having substantially opposite phases and may be provided by the inverter IP. Exemplary embodiments include configurations wherein the inverter IP may be separate from the balance board 100 or may be formed in one body with the balance board 100.

First ends of the odd-numbered lamps 60a and 60c may be connected to the first balance coils 140, and second ends of the odd-numbered lamps 60a and 60c may be connected to a ground. First ends of the even-numbered lamps 60b and 60d may be connected to the second balance coils 145, and second ends of the even-numbered lamps 60b and 60d may be connected to the ground.

A transformer 147 may be connected to the loop of the first coils of the first balance coils 140 and the first coils of the second balance coils 145. The transformer 147 may adjust a voltage applied to the loop of the first coils of the first balance coils 140 and the first coils of the second balance coils 145 and may provide the adjusted voltage to detection terminals S1 and S2. The detection terminals S1 and S2 may detect a current that flows along the loop of the first coils of the first balance coils 140 and the first coils of the second balance coils 145 and may thus enable feedback control to be performed on the first and second power supply voltages V1 and V2 based on the results of the detection.

Figure 6:
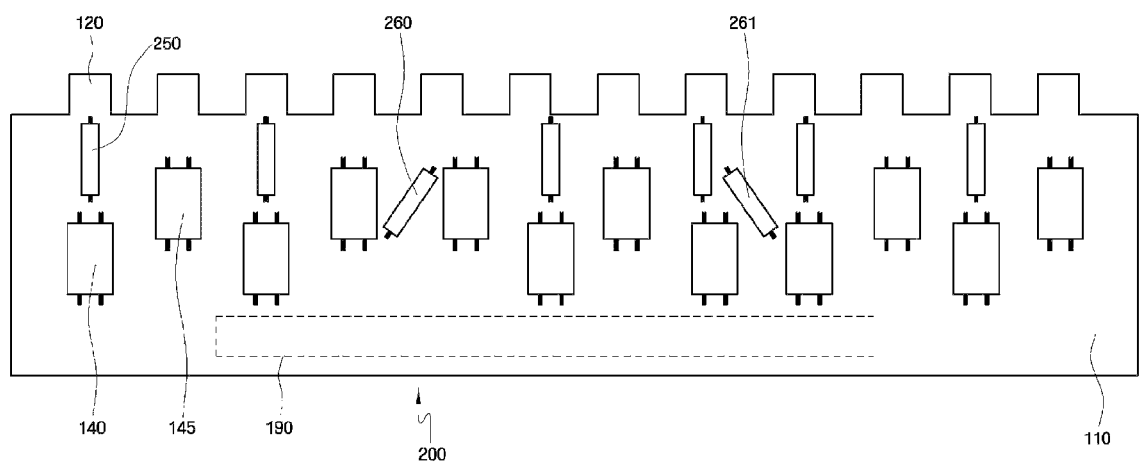
FIG. 6 is a top plan view of another exemplary embodiment of a balance board according to the present invention.
Figure 7:
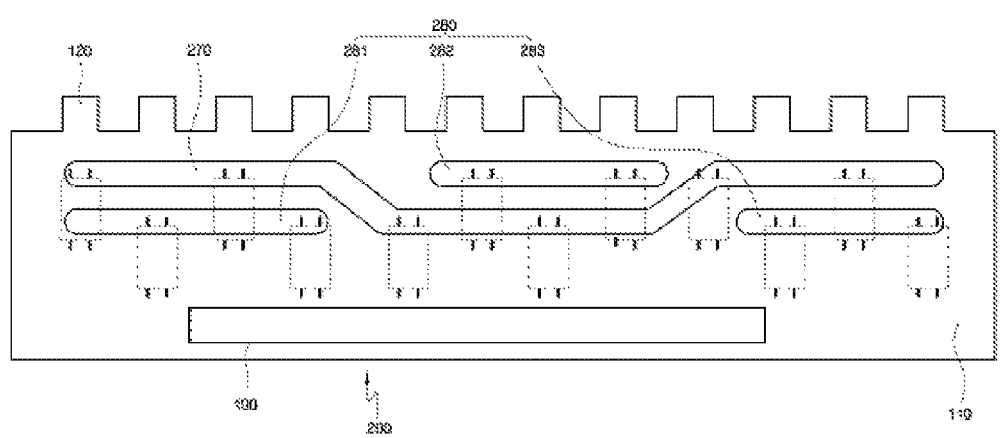
FIG. 7 is a bottom plan view of another exemplary embodiment of a balance board shown in FIG. 6.

Another exemplary embodiment of a balance board according to the present invention will hereinafter be described in detail with reference to FIGS. 6 and 7. FIG. 6 is a top plan view of another exemplary embodiment of a balance board 200 according to the present invention, and FIG. 7 is a bottom plan view of the exemplary embodiment of a balance board 200. In FIGS. 2, 3, 6 and 7, like reference numerals indicate like elements, and thus, detailed descriptions thereof will be omitted.

Referring to FIGS. 6 and 7, first and second wires 270 and 280 may be disposed substantially in parallel with each other and may cross-over each other twice.

The balance board 200 may include a substrate 110, a plurality of first balance coils 140, a plurality of second balance coils 145, a plurality of first jumper connectors 260 and 261, a plurality of second jumper connectors 250, a conductive pattern 190, the first wire 270 and the second wire 280.

In one exemplary embodiment, the first balance coils 140, the second balance coils 145, the first jumper connectors 260 and 261, and the second jumper connectors 250 may be formed on the top surface of the balance board 200. The first balance coils 140 may be connected to one another by the first wire 270, and the second balance coils 145 may be connected to one another by the second wire 270. High AC voltages having substantially opposite phases may be applied to the first and second wires 270 and 280.

Since the phase of the high AC voltage applied to the first wire 270 is substantially opposite to the phase of the high AC voltage applied to the second wire 280, the first and second wires 270 and 280 may be spaced apart from each other in order to reduce the probability of being discharged, e.g., short-circuiting.

The conductive pattern 190 may be formed on the substrate 110 and may form a capacitor together with each of the first and second wires 270 and 280. The conductive pattern 190 may be a predetermined distance apart from the first and second wires 270 and 280 so as to be capacitively coupled to the first and second wires 270 and 280.

More specifically, the first wire 270 and the conductive pattern 190 may form a first capacitor, and the second wire 280 and the conductive pattern 190 may form a second capacitor. In this case, the difference between the capacitance of the first capacitor and the capacitance of the second capacitor may be about 5 pF or less.

In order to maintain the difference between the capacitance of the first capacitor and the capacitance of the second capacitor at about 5 pF or less, the first and second wires 270 and 280 may be disposed substantially in parallel with each other, and the second wire 280 may be divided into a plurality of parts about the first wire 270, e.g., three parts 281, 282 and 283, by intersecting the second wire 280 at least twice. The three parts 281, 282 and 283 of the second wire 280 may be connected by the first jumper connectors 260 and 261, which overlap the first wire 270 on the opposite side of the balance board 200.

Figure 8:
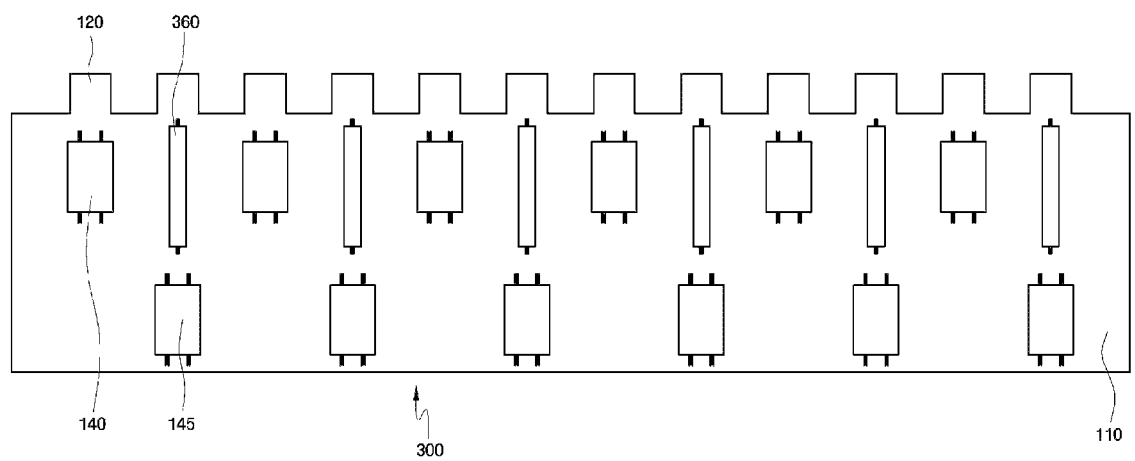
FIG. 8 is a top plan view of another exemplary embodiment of a balance board according to the present invention.
Figure 9:
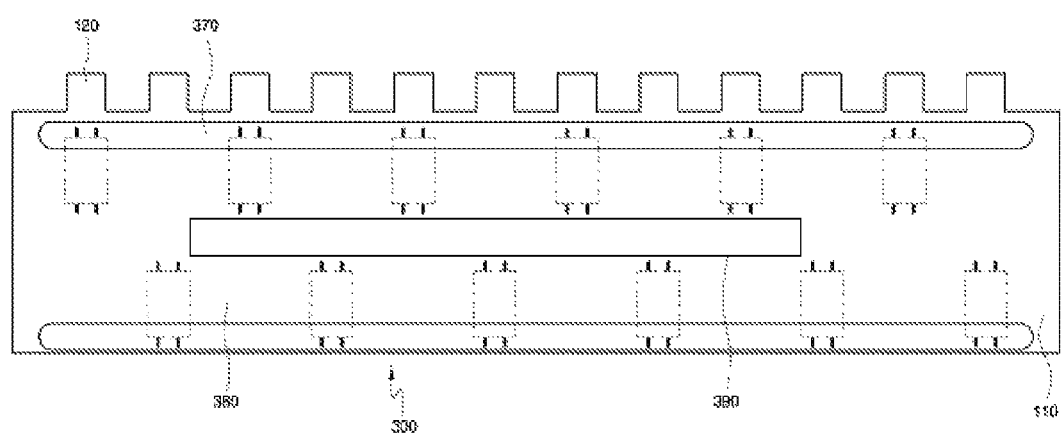
FIG. 9 is a bottom plan view of the another exemplary embodiment of a balance board shown in FIG. 8.

Another exemplary embodiment of a balance board according to the present invention will hereinafter be described in detail with reference to FIGS. 8 and 9. FIG. 8 is a top plan view of another exemplary embodiment of a balance board 300 according to the present invention, and FIG. 9 is a bottom plan view of the balance board 300. In FIGS. 2, 3, 8 and 9, like reference numerals indicate like elements, and thus, detailed descriptions thereof will be omitted.

Referring to FIGS. 8 and 9, first and second wires 370 and 380 may be disposed substantially in parallel with each other, and a conductive pattern 390 may be formed between the first and second wires 370 and 380.

The first wire 370 and the conductive pattern 390 may form a first capacitor, and the second wire 380 and the conductive pattern 390 may form a second capacitor. In this exemplary embodiment, the difference between the capacitance of the first capacitor and the capacitance of the second capacitor may be about 5 pF or less.

In order to maintain the difference between the capacitance of the first capacitor and the capacitance of the second capacitor at about 5 pF or less, the first and second wires 370 and 380 may be disposed substantially in parallel with each other, and the conductive pattern 390 may be formed between the first and second wires 370 and 380. The distance between the first wire 370 and the conductive pattern 390 may be substantially the same as the distance between the second wire 380 and the conductive pattern 390.

Since high AC voltages having opposite phases are applied to the first and second wires 370 and 380, the first and second wires 370 and 380 may be disposed on either end of a substrate 110 and may thus be as distant as possible from each other while remaining on the same substrate 110.

A plurality of jumper connectors 360 may be used to connect a plurality of second balance coils 145 and a plurality of protrusions 120.

Figure 10:
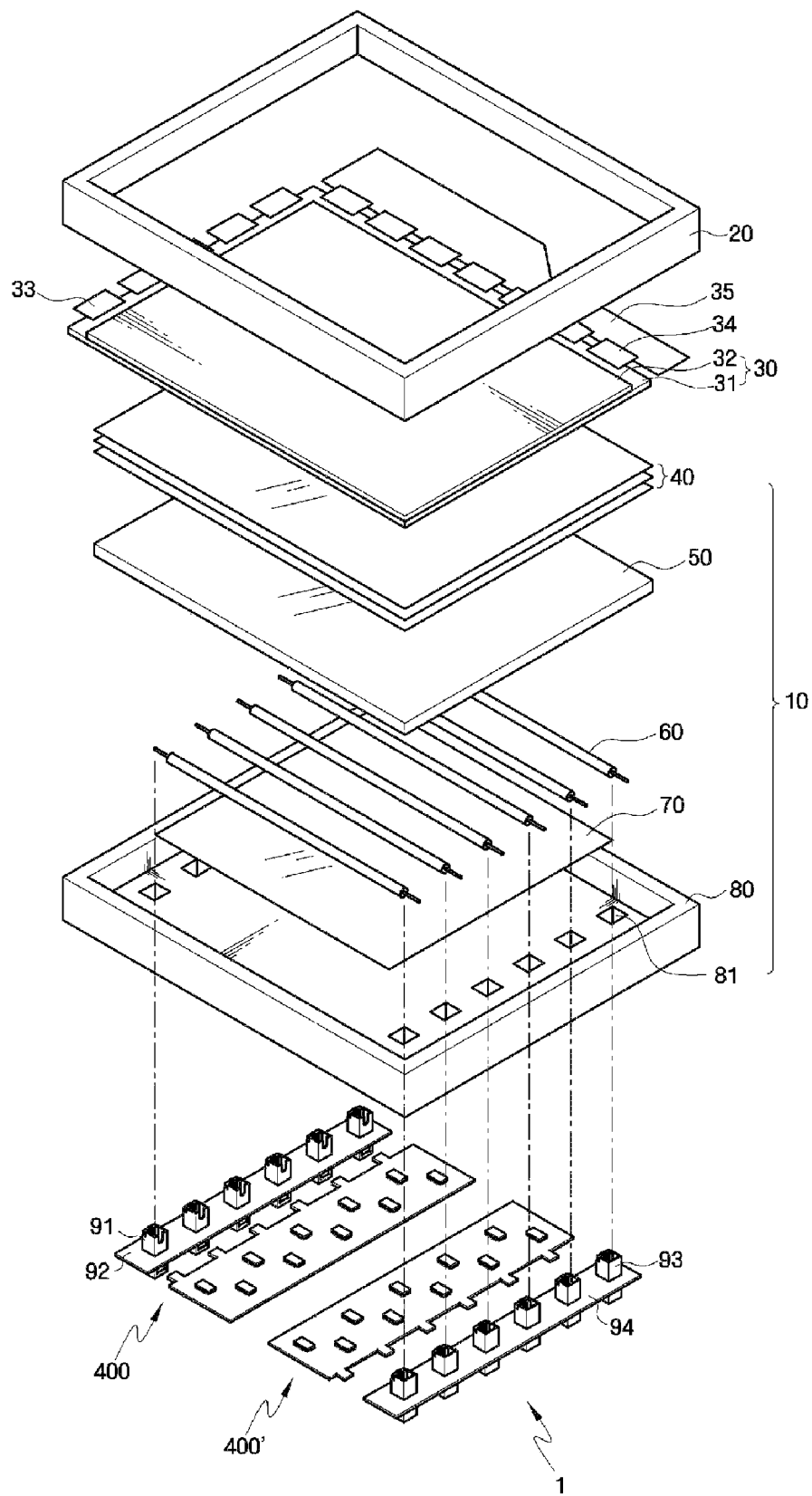
FIG. 10 is an exploded front perspective view of another exemplary embodiment of an LCD according to the present invention.

Another exemplary embodiment of an LCD according to the present invention will hereinafter be described in detail with reference to FIGS. 10 through 12. FIG. 10 is an exploded front perspective view of another exemplary embodiment of an LCD 2 according to the present invention, FIG. 11 is an equivalent circuit diagram illustrating a plurality of lamps 60, first and second balance boards 400 and 400' and an inverter IP of the exemplary embodiment of an LCD 2, and FIG. 12 is a waveform diagram illustrating the waveforms of voltages applied to the exemplary embodiments of the first and second balance boards 400 and 400'.

Figure 11:
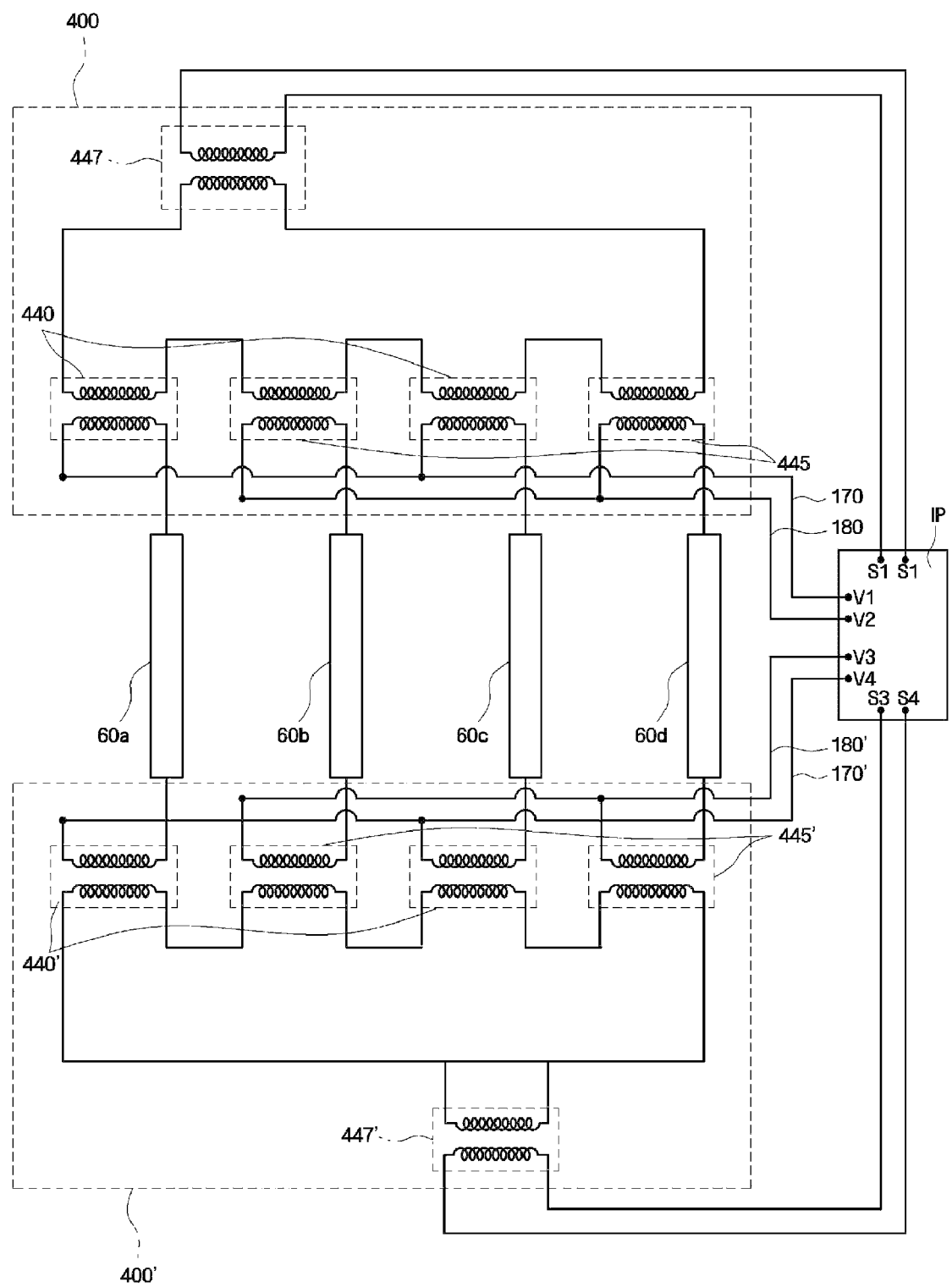
FIG. 11 is an equivalent circuit diagram illustrating a plurality of lamps, exemplary embodiments of the first and second balance boards and an inverter of the exemplary embodiment of an LCD shown in FIG. 10.
Figure 12:
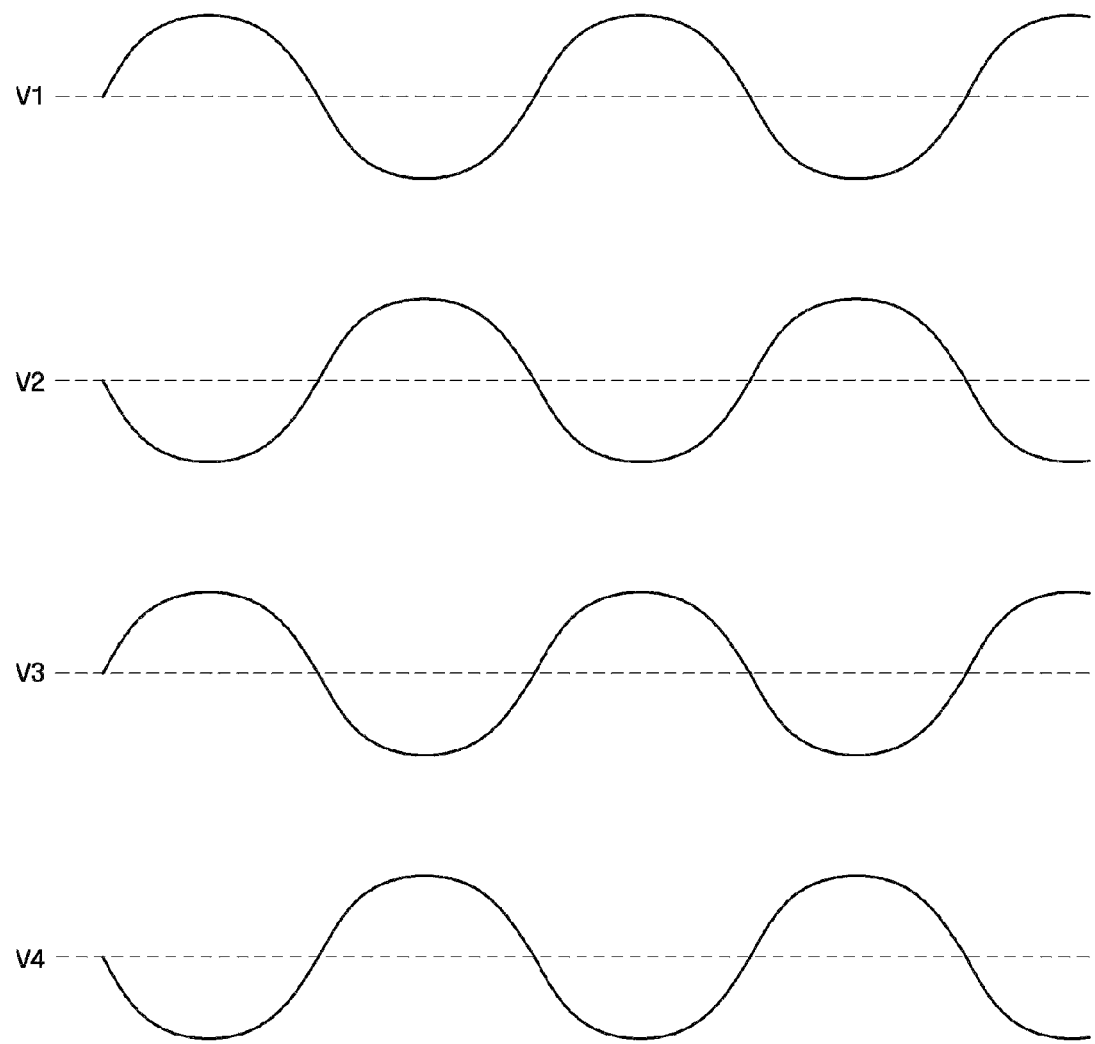
FIG. 12 is a waveform diagram illustrating the waveforms of voltages applied to the exemplary embodiments of the first and second balance boards shown in FIG. 11.

Referring to FIGS. 10 through 12, the first and second balance boards 400 and 400' may be connected to either end of each of a plurality of lamps 60.

The first and second balance boards 400 and 400' may be provided with a driving voltage by the inverter IP and may thus provide a uniform driving current to each of the lamps 60. The first balance board 400 may be inserted into a plurality of first lamp sockets 91, which are connected to first ends of the lamps 60, and the second balance board 400' may be inserted into a plurality of lamp sockets 93, which are connected to second ends of the lamps 60.

The first balance board 400 may include a plurality of first balance coils 440 and a plurality of second balance coils 445, and the second balance board 400' may include a plurality of first balance coils 440' and a plurality of second balance coils 445'. In one exemplary embodiment, each of the first balance coils 440, the first balance coils 440', the second balance coils 445, and the second balance coils 445' may be a transformer having first and second coils. The output voltage of each of the first balance coils 440, the first balance coils 440', the second balance coils 445, and the second balance coils 445' may be adjusted according to variations in the first and second coils of a corresponding balance coil. Since the first balance coils 440, the first balance coils 440', the second balance coils 445, and the second balance coils 445' are mainly for adjusting current variations, the input voltages of the first balance coils 440, the first balance coils 440', the second balance coils 445, and the second balance coils 445' may not necessarily have to be adjusted. The input voltages and the output voltages of the first balance coils 440, the first balance coils 440', the second balance coils 445, and the second balance coils 445' may be maintained to be uniform.

The first coils of the first balance coils 440 and the first coils of the second balance coils 445 may be connected together and may thus form a loop. Likewise, the first coils of the first balance coils 440' and the first coils of the second balance coils 445' may be connected together and may thus form a loop. Since the same current flows along the first coils of the first balance coils 440 and the first coils of the second balance coils 445 and along the first coils of the first balance coils 440' and the first coils of the second balance coils 445', the same driving current may be applied to each of the lamps 60 through the first balance coils 440, the first balance coils 440', the second balance coils 445, and the second balance coils 445'.

First ends of the second coils of the first balance coils 440 may be connected to a first wire 170, and second ends of the second coils of the first balance coils 440 may be connected to odd-numbered lamps 60a and 60c. Likewise, first ends of the second coils of the first balance coils 440' may be connected to another first wire 170', and second ends of the second coils of the first balance coils 440' may be connected to the odd-numbered lamps 60a and 60c.

On the other hand, first ends of the second coils of the second balance coils 445 may be connected to a second wire 180, and second ends of the second coils of the second balance coils 445 may be connected to even-numbered lamps 60b and 60d. Likewise, first ends of the second coils of the second balance coils 445' may be connected to another second wire 180', and second ends of the second coils of the second balance coils 445' may be connected to the even-numbered lamps 60b and 60d.

A first power supply voltage V1 may be applied to first ends of the odd-numbered lamps 60a and 60c through the first balance coils 440 of the first balance board 400, and a fourth power supply voltage V4 may be applied to second ends of the odd-numbered lamps 60a and 60c through the first balance coils 440' of the second balance board 400'. Referring to FIG. 12, the first and fourth power supply voltages V1 and V4 may be high AC voltages having substantially opposite phases. That is, high AC voltages having substantially opposite phases may be applied to the odd-numbered lamps 60a and 60c.

A second power supply voltage V2 may be applied to first ends of the even-numbered lamps 60b and 60d through the second balance coils 445 of the first balance board 400, and a third power supply voltage V3 may be applied to second ends of the even-numbered lamps 60b and 60d through the second balance coils 445' of the second balance board 400'. Referring to FIG. 12, the second and third power supply voltages V2 and V3 may be high AC voltages having substantially opposite phases. That is, high AC voltages having substantially opposite phases may be applied to the even-numbered lamps 60b and 60d.

Referring to FIG. 12, the first and second power supply voltages V1 and V2 may have substantially opposite phases, and the third and fourth power supply voltages V3 and V4 may have opposite phases.

In one exemplary embodiment, the first power supply voltage V1 may be substantially the same as the third power supply voltage V3, and the second power supply voltage V2 may be substantially the same as the fourth power supply voltage V4.

The first through fourth power supply voltages V1 through V4 may be supplied by the inverter IP. The first balance board 400 may include a transformer 447 applying a detection signal to detection terminals S1 and S2, and the second balance board 400' may include a transformer 447' applying a detection signal to detection terminals S3 and S4. Thus, feedback control may be performed on the first through fourth power supply voltages V1 through V4.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A balance board comprising:
a substrate;
a first wire disposed on the substrate and to which a first power supply voltage is applied;
a second wire disposed on the substrate and spaced apart from the first wire and to which a second power supply voltage having a substantially opposite phase to that of the first power supply voltage is applied;
a plurality of first balance coils connected to the first wire and which uniformly distribute the first power supply voltage;
a plurality of second balance coils connected to the second wire and which uniformly distribute the second power supply voltage; and
a conductive pattern disposed on the substrate and spaced apart from the first and second wires,
wherein the first and second wires are disposed substantially in parallel with each other along a long axis defining the substrate, the second wire being divided into a plurality of parts with respect to an area where the first wire and the second wire cross over one another, and the plurality of parts of the second wire are connected by a plurality of jumper connectors overlapping the first wire.

2. The balance board of claim 1, wherein:
each of the first balance coils and the second balance coils respectively includes first and second coils; and
the first coils of the first balance coils and the first coils of the second balance coils form a loop.

3. The balance board of claim 2, wherein:
the second coils of the first balance coils are connected to the first wire; and
the second coils of the second balance coils are connected to the second wire.

4. The balance board of claim 2, further comprising a plurality of detection terminals connected to the loop and which detect a current.

5. The balance board of claim 4, further comprising a transformer connected between the loop and the detection terminals.

6. The balance board of claim 1, wherein:
the first and second wires are disposed on a first surface of the substrate; and
the jumper connectors are disposed on a second surface of the substrate.

7. The balance board of claim 1, wherein:
the first wire and the conductive pattern form a first capacitor;
the second wire and the conductive pattern form a second capacitor; and
the difference between the capacitance of the first capacitor and the capacitance of the second capacitor is about 5 pF or less.

8. The balance board of claim 1, wherein the first and second power supply voltages are high alternating current voltages.

9. A liquid crystal display comprising:
a liquid crystal panel which displays an image;
a plurality of lamps which provide light to the liquid crystal panel; and
a balance board comprising:
a substrate;
a first wire disposed on the substrate and to which a first power supply voltage is applied;
a second wire disposed on the substrate and spaced apart from the first wire and to which a second power supply voltage having a substantially opposite phase to that of the first power supply voltage is applied;
a plurality of first balance coils connected to the first wire and which uniformly distribute the first power supply voltage;
a plurality of second balance coils connected to the second wire and which uniformly distribute the second power supply voltage; and
a conductive pattern disposed on the substrate and spaced apart from the first and second wires,
wherein the first and second wires are disposed substantially in parallel with each other along a long axis defining the substrate, the second wire being divided into a plurality of parts with respect to an area where the first wire and second wire cross-over one another and the plurality of parts of the second wire are connected by a plurality of jumper connectors overlapping the first wire.

10. The liquid crystal display of claim 9, wherein:
each of the first balance coils and the second balance coils respectively includes first and second coils; and
the first coils of the first balance coils and the first coils of the second balance coils form a loop.

11. The liquid crystal display of claim 10, wherein:
the second coils of the first balance coils are connected to the first wire; and
the second coils of the second balance coils are connected to the second wire.

12. The liquid crystal display of claim 10, further comprising a plurality of detection terminals connected to the loop and which detect a current.

13. The liquid crystal display of claim 12, further comprising a transformer connected between the loop and the detection terminals.

14. The liquid crystal display of claim 9, wherein:
the first and second wires are disposed on a first surface of the substrate; and
the jumper connectors are disposed on a second surface of the substrate.

15. The liquid crystal display of claim 9, wherein:
the first wire and the conductive pattern form a first capacitor;
the second wire and the conductive pattern form a second capacitor; and the difference between the capacitance of the first capacitor and the capacitance of the second capacitor is about 5 pF or less.

16. The liquid crystal display of claim 9, wherein:
the lamps include a plurality of first lamps connected to the first wire and a plurality of second lamps connected to the second wire; and
the first lamps and the second lamps are alternately arranged.

17. The liquid crystal display of claim 9, wherein:
first ends of the lamps are connected to one of the first wire and the second wire; and
second ends of the lamps are grounded.

18. The liquid crystal display of claim 9, wherein the balance board includes a first balance board connected to first ends of the lamps and a second balance board connected to second ends of the lamps.

19. The liquid crystal display of claim 9, wherein the first and second power supply voltages are high alternating current voltages.

20. A balance board comprising:
a substrate;
a first wire disposed on the substrate and to which a first power supply voltage is applied;
a second wire disposed on the substrate and spaced apart from the first wire and to which a second power supply voltage having a substantially opposite phase to that of the first power supply voltage is applied;
a plurality of first balance coils connected to the first wire and which uniformly distribute the first power supply voltage;
a plurality of second balance coils connected to the second wire and which uniformly distribute the second power supply voltage; and
a conductive pattern disposed on the substrate and spaced apart from the first and second wires,
wherein the first and second wires are disposed substantially in parallel with each other along a long axis defining the substrate, and opposite one another with respect to the conductive pattern.

21. The balance board of claim 1, wherein the plurality of parts of the second wire are connected by a plurality of jumper connectors overlapping the first wire are disposed on the substrate, which is a single substrate.

22. The liquid crystal display of claim 9, wherein the plurality of parts of the second wire are connected by a plurality of jumper connectors overlapping the first wire are disposed on the substrate, which is a single substrate.

* * * * *